United States Patent [19]

Hanzawa

[11] Patent Number: 6,054,000
[45] Date of Patent: Apr. 25, 2000

[54] PRESSURE PLATE AND PROCESS FOR PRODUCTION OF LIQUID CRYSTAL PANEL USING SAID PRESSURE PLATE

[75] Inventor: Shigeru Hanzawa, Kagamihara, Japan

[73] Assignee: NGK Insulators, Ltd., Nagoya, Japan

[21] Appl. No.: 08/925,791

[22] Filed: Sep. 9, 1997

Related U.S. Application Data

[62] Division of application No. 08/698,273, Aug. 15, 1996, abandoned, which is a continuation of application No. 08/406,397, Mar. 20, 1995, abandoned.

[30] Foreign Application Priority Data

Mar. 25, 1994 [JP] Japan .................................. 6-56059
Dec. 28, 1994 [JP] Japan ................................. 6-326662

[51] Int. Cl.[7] .................................................. B32B 17/00
[52] U.S. Cl. ............................................ 156/99; 156/228
[58] Field of Search ............................. 264/600; 156/99, 156/145, 228

[56] References Cited

U.S. PATENT DOCUMENTS

| | | | |
|---|---|---|---|
| 4,463,114 | 7/1984 | Balchunis | 524/157 |
| 4,467,043 | 8/1984 | Kriegesmann | 501/88 |
| 4,795,673 | 1/1989 | Frechette | 428/331 |
| 5,231,923 | 8/1993 | Ohta | 100/46 |
| 5,338,576 | 8/1994 | Hanzawa | 427/430.1 |

FOREIGN PATENT DOCUMENTS

| | | |
|---|---|---|
| 0 381 176 A2 | 8/1990 | European Pat. Off. . |
| 86 06 577 | 6/1986 | Germany . |
| 42 43 941 A1 | 7/1993 | Germany . |
| 3-150527 | 6/1991 | Japan . |
| 4-247430 | 9/1992 | Japan . |
| 4-275527 | 10/1992 | Japan . |
| 4-301814 | 10/1992 | Japan . |

Primary Examiner—Timothy Speer
Attorney, Agent, or Firm—Kubovcik & Kubovcik

[57] ABSTRACT

The present invention provides: a pressure plate used in a press for production of a liquid crystal panel, the plate being composed of an Si—SiC sintered material containing SiC and Si, and a process for producing a liquid crystal panel. The process includes sealing a liquid crystal in between a plurality of substrates and subjecting the resulting material to pressurization and heating by the use of a pair of the above pressure plates to bond the plurality of substrates. The process using the pressure plates can provide a liquid crystal panel which produces substantially no strain when heated, which has good gap accuracy between substrates, and which has a small surface roughness and high dimensional accuracy. Moreover, the process can produce a liquid crystal panel economically and in a smaller number of steps.

5 Claims, 3 Drawing Sheets

RUBBING

PRESSURE PLATE AND PROCESS FOR PRODUCTION OF LIQUID CRYSTAL PANEL USING SAID PRESSURE PLATE

This application is a divisional of application Ser. No. 08/698,273 filed Aug. 15, 1996, now abandoned, which is a continuation of application Ser. No. 08/406,397 filed Mar. 20, 1995, now abandoned.

BACKGROUND OF THE INVENTION

1. Field of the Invention

The present invention relates to a pressure plate used when a liquid crystal panel is produced by pressurizing two (upper and lower) glass substrates containing a liquid crystal between them, as well as to a process for producing a liquid crystal panel by the use of said pressure plate.

2. Prior Art

As a press used for production of liquid crystal panels, there has hitherto been known, for example, an apparatus disclosed in Japanese Patent Application Kokai (Laid-Open) No. 301814/1992. With this apparatus, two (upper and lower) glass substrates each provided with a transparent electrode are arranged with a given gap provided between them; spacers and a liquid crystal are placed in the gap and the periphery of the resulting material is sealed; then, the material is pressurized at normal temperature by the use of a pair of pressure plates (a pressurizing plate and a pressure-receiving plate) to conduct bonding; the material after pressurization is heated to about 200° C. to allow the liquid crystal to be uniformly present in the gap; thereby, a liquid crystal panel is produced.

The pressure plates used in such a process for liquid crystal production have been stainless steel plates of about 200 mm×250 mm, in many cases. As the liquid crystal panel has become larger in recent years, pressure plates of about 400 mm×350 mm or larger have become necessary; and investigations are being made to use, in addition to stainless steel plates, pressure plates made of alumina, crystallized glass, graphite, silicon carbide or the like.

Each of these conventional pressure plates for use in a press, however, has problems. For example, stainless steel plates have a large thermal expansion coefficient although they have a high electric conductivity; therefore, when heated to about 200° C., they produce a strain and it is highly possible that; the liquid crystal panel obtained has a strain at the image surface. The pressure plates made of crystallized glass, graphite or the like have a low electric conductivity, are easily charged with static electricity and adsorb dust, producing a defective liquid crystal panel. The pressure plates made of pure silicon carbide have a large shrinkage ratio when fired although they have a high electric conductivity; therefore, they are greatly deformed by warpage when heated; this makes the produced liquid crystal panel rough at the center when the panel is a thick panel, and a longer time is required for the finish.

SUMMARY OF THE INVENTION

Hence, the present invention is intended to provide a pressure plate for use in a press, which is free from the above-mentioned problems of the prior art.

According to the present invention, there is provided a pressure plate for use in a press for production of liquid crystal panel, and which is composed of a SiC-based sintered material containing SiC and Si.

In the pressure plate of the present invention, the Si content in the Si—SiC sintered material is preferably 3–63% by weight. Further, the pressure plate preferably has a thermal expansion coefficient of $3 \times 10^{-6}$ 1/°C. or less and a thermal conductivity of 130 W/m.K or more.

The pressure plate of the present invention may partially or wholly be covered with at least one resin selected from a silicone rubber, a polytetrafluoroethylene (Tradename: Teflon) and a urethane resin.

According to the present invention, there is also provided a process for producing a liquid crystal panel, which comprises sealing a liquid crystal in between a plurality of substrates and subjecting the resulting material to pressurization and heating by the use of a pair of the above pressure plates to bond said plurality of substrates.

DETAILED DESCRIPTION OF THE INVENTION

Figure 1:
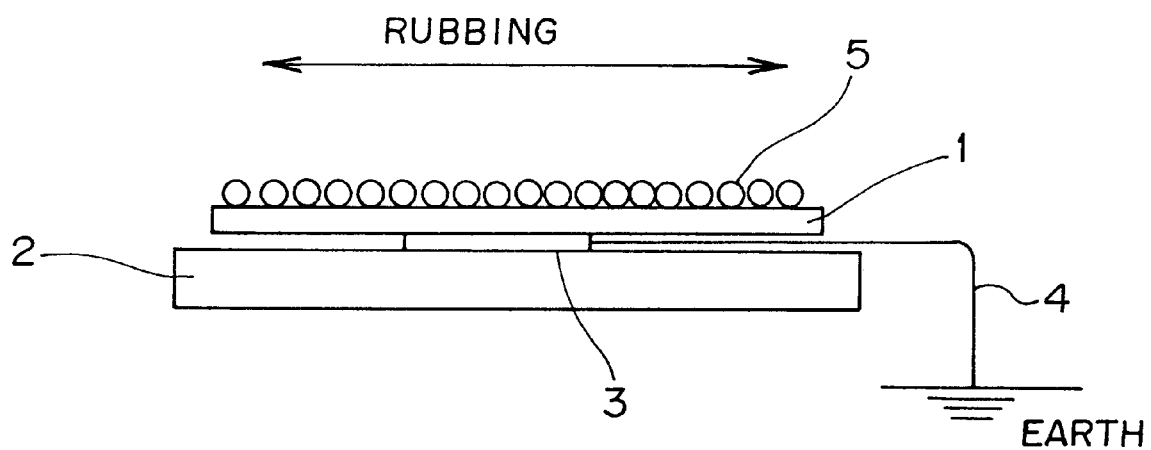
FIG. 1 is a drawing showing a test method for measuring the electric conductivity of a pressure plate by examining adhesion of foamed polystyrene balls onto said plate.

In liquid crystal panels, it is important that the gap between two glass substrates has good accuracy, the surface roughness of each glass substrate is small and the dimensional accuracy is high. When a liquid crystal panel has a nonuniform gap between two glass substrates, the panel fails to provide a clear image and gives nonuniformity in color.

The present inventors made a study and found out that the important properties to be possessed by a pressure plate used in a press for production of liquid crystal panel are a small thermal expansion coefficient, a large electric conductivity and a large thermal conductivity. Then, the present inventors made an effort in order to search or produce a material having such properties.

A pressure plate having a large thermal expansion coefficient produces a strain when heated to about 200° C., which gives low gap accuracy between two glass substrates, allows each glass substrate to have a large surface roughness, and provides a liquid crystal panel of low dimensional accuracy. A pressure plate having a small electric conductivity tends to build up static electricity and adsorb dust, resulting in production of a defective liquid crystal panel and low product yield.

As a result of the above study and effort, the present inventors found out that an Si—SiC sintered material containing a given amount of Si is very desirable as a material for a pressure plate satisfying the above-mentioned property requirements.

The Si—SiC sintered material has an Si content of preferably 3–63% by weight, more preferably 10–30% by weight, because an Si—SiC sintered material having such an Si content has a large electric conductivity and consequently is not charged with static electricity and moreover such a material has a strength of a certain level or larger.

The Si—SiC sintered material having an Si content of the above range, further has a small thermal expansion coefficient of $3 \times 10^{-6}$ 1/°C. or less, preferably $2.5 \times 10^{-6}$ 1/°C. or less, and a large thermal conductivity of 130 W/m.K or more, preferably 150 W/m.K or more. Therefore, a pressure plate made of such an Si—SiC sintered material produces only a small strain when it is placed on or beneath a liquid crystal panel, a pressure is applied on it and it is heated to about 200° C. Thus, use of such a pressure plate enables production of a large-sized liquid crystal panel. In the conventional production of a liquid crystal panel, two glass substrates were pressurized for bonding and then heated in an atmosphere of about 200° C. to allow a liquid crystal to be uniformly present in the gap between the two substrates; meanwhile, when the pressure plates of the present invention are used, the pressurization and heating can be conducted simultaneously because they produce only a small strain when heated to about 200° C., and a liquid crystal panel can be produced in a smaller number of steps in the present invention than in the conventional process.

That is, in the present invention, a liquid crystal, spacers, a color filter, etc. are sealed in between glass substrates (generally two glass substrates) each provided with a transparent electrode; the periphery of the resulting material is sealed; two pressure plates are placed on and beneath the sealed material; a pressure is applied on the two pressure plates and, preferably simultaneously therewith, heating is conducted; thereby, a liquid crystal panel is economically in a smaller number of steps.

The pressure plate of the present invention used for production of a liquid crystal panel may be covered with a resin. The resin must not be deteriorated when heated and, as the resin, there can preferably be used, for example, a silicone rubber, polytetrafluoroethylene or a urethane resin. The pressure plate may be covered partially or wholly with the resin. Since the pressure plate of the present invention for production of a liquid crystal panel has radiation ratios of a certain value or larger over the entire wavelength region (5–25 $\mu$m) required for heating a material, stable heating is possible independently of the kind of the resin used, etc.

As the substrates, there can be used not only the above-mentioned glass substrates but also resin-made substrates, etc.

The pressurization using the pressure plates of the present invention is generally conducted at a pressure of 0.5–0.7 kg/cm$^2$. The heating is conducted generally at 150–250° C. for about 20–30 minutes although it varies depending upon the kind of the liquid crystal used.

The pressure plate made of an Si—SiC sintered material of the present invention can be produced as follows.

First, a C powder, an SiC powder, a binder and water or an organic solvent each of a given amount are kneaded and molded to obtain a molded material of desired shape. Then, the molded material is placed in a metallic Si atmosphere in an inert gas of reduced pressure or in a vacuum to impregnate the molded material with metallic Si to obtain a pressure plate made of an Si—SiC sintered material. In an alternative process, a graphite sheet or a carbon sheet is placed in a crucible or the like filled with metallic Si; the crucible is heated to melt the metallic Si; thereby, the carbon constituting the sheet is reacted with Si by the utilization of a capillary effect to form SiC and allow residual Si to remain as Si.

The present invention is hereinafter described in more detail by way of Examples. However, the present invention is not restricted to these Examples.

EXAMPLE 1

There was prepared a pressure plate sample 1 consisting of an Si—SiC sintered material having a composition of 20% by weight of Si and 80% by weight of SiC, a dimension of 400 mm×350 mm×5 mm (thickness), a surface roughness of 3–8 $\mu$m and a flatness of 20–25 $\mu$m. This sample 1 was measured for electric conductivity (number of remaining foamed polystyrene balls), according to a test method shown in FIG. 1. That is, a copper plate 3 of 100 mm×100 mm×1 mm (thickness) was placed on an insulating rubber plate 2 of 500 mm×500 mm×5 mm (thickness); the copper plate 3 was connected to an earth wire 4 and electrically grounded; the pressure plate sample 1 was placed on the copper plate 3; and the entire surface of the sample 1 was rubbed 50 times with an acrylic resin cloth.

Then, 200 foamed polystyrene balls 5 each of 4 mm in diameter were placed on the sample 1; and the sample 1 was turned upside down to examine the number of the foamed polystyrene balls 5 adhering onto the sample 1. The test was conducted in a room of 25° C. and 70% (humidity).

The result is shown in Table 1.

COMPARATIVE EXAMPLES 1–3

There were prepared pressure plate samples each having the same dimension, surface roughness and flatness as those of the pressure plate sample 1 of Example 1 and composed of a crystallized glass ($Li_2O$: 5% by weight, $Al_2O_3$: 25% by weight and $SiO_2$: 70% by weight), 18–8 stainless steel or alumina of 99% purity.

The samples were measured for electric conductivity (number of remaining foamed polystyrene balls) in the same manner as in Example 1. The results are shown in Table 1.

TABLE 1

| balls | Composition | Number of remaining balls of foamed polystyrene |
|---|---|---|
| Example 1 | Si—SiC sintered material | 0 |
| Comparative Example 1 | Crystallized glass | 130 |
| Comparative Example 2 | 18-8 stainless steel | 0 |
| Comparative Example 3 | Alumina of 99% purity | 85 |

As is clear from Table 1, the pressure plate samples made of an Si—SiC sintered material or 18–8 stainless steel have high electric conductivities; in these samples, therefore, static electricity disappears via the copper plate 3 and does not build up. Meanwhile, the pressure plate samples made of crystallized glass or alumina of 99% purity have low electric conductivities and are easily charged with static electricity.

EXAMPLE 2

The same pressure plate sample (consisting of an Si—SiC sintered material) as used in Example 1 was heated on a hot plate heated at 300° C. When the surface temperature of the sample center reached 200° C., the sample was measured for change of flatness from that of room temperature by the use of a three-dimension tester (WMM 550 manufactured by ZEISS). The result is shown in Table 2.

COMPARATIVE EXAMPLES 4–6

The same pressure plate samples (consisting of crystallized glass, 18–8 stainless steel or alumina of 99% purity) as used in Comparative Examples 1–3 were measured for change of flatness in the same manner as in Example 2. The results are shown in Table 2.

Figure 2:
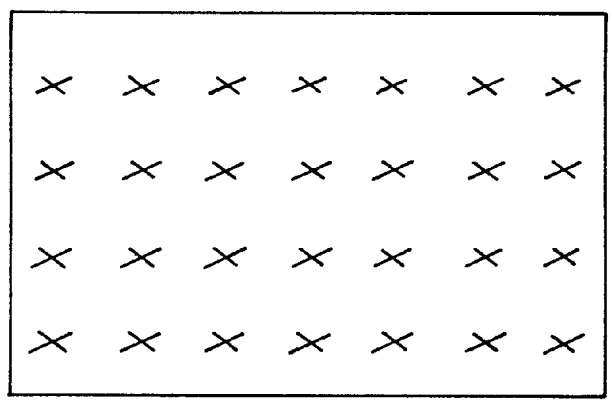
FIG. 2 is a drawing showing a plane used for measurement of flatness.

Flatness was measured as follows. As shown in FIG. 2, on a plane of 400 mm×350 mm were selected 20 points substantially uniformly; the 20 points were measured for three dimensions; calculation was made from the data to determine a virtual plane; deviations of the 20 points from the virtual plane were calculated and the maximum deviation and the minimum deviation were obtained; the sum of the maximum and minimum deviations was taken as the flatness of the plane.

TABLE 2

| | Composition | Flatness R. temp. | 200° C. | Change |
|---|---|---|---|---|
| Example 2 times | Si—SiC sintered material | 21 | 38 | 1.8 |
| Comparative Example 4 times | Crystallized glass | 24 | 79 | 3.3 |
| Comparative Example 5 times | 18-8 stainless steel | 20 | 390 | 19.5 |
| Comparative Example 6 times | Alumina of 99% purity | 25 | 81 | 3.2 |

As is clear from Table 2, the pressure plate sample consisting of an Si—SiC sintered material, as compared with the pressure plate samples consisting of crystallized glass, 18–8 stainless steel or alumina of 99% purity, shows a very small flatness change.

EXAMPLE 3

Pressure plate samples "a" to "g" each consisting of an Si—SiC sintered material but having a different Si content were measured for electric conductivity (number of remaining foamed polystyrene balls) in the same manner as in Example 1, as well as for bending strength according to JIS R 1601.

The samples "a" to "g" were produced as follows.

1.5% by weight of $B_4C$ was added to a β-SiC powder having an average particle diameter of 1.5 μm, followed by mixing and molding. The molded material was sintered at 2,000° C. to obtain a dense SiC sintered material as a sample "a". The sample "a" was impregnated with Si and fired to obtain a sample "b".

There were prepared three molded materials each composed of a β-SiC powder having an average particle diameter of 1.5 μm and 1.5% by weight of $B_4C$ but each having a different density. The molded materials were impregnated with Si to obtain samples "c", "d" and "e". Further, there were prepared two molded materials each composed of a β-SiC powder having an average particle diameter of 30 μm and metallic Si having an average particle diameter of 200 μm. The molded materials were impregnated with Si to obtain samples "f" and "g".

The results of electric conductivities (numbers of remaining foamed polystyrene balls) and bending strengths, of the samples "a" to "g" are shown in Table 3. In Table 4 is shown the change of thermal expansion coefficient by temperature, of the sample "d".

TABLE 3

| Sample | Si content (wt. %) | Number of foamed polystyrene balls | Bending strength (kgf/mm²) |
|---|---|---|---|
| a | 0 | 2 | 55 |
| b | 3 | 0 | 53 |
| c | 10 | 0 | 26 |
| d | 21 | 0 | 24 |
| e | 30 | 0 | 21 |
| f | 63 | 0 | 8 |
| g | 70 | 0 | Impossible to measure |

TABLE 4

| Temp. (° C.) | Thermal expansion coefficient ($\times 10^{-5}$) (1/° C.) |
|---|---|
| 100 | 1.655 |
| 150 | 1.998 |
| 200 | 2.579 |
| 250 | 3.151 |
| 300 | 3.189 |
| 350 | 3.503 |
| 400 | 3.713 |
| 450 | 3.890 |
| 500 | 3.944 |
| 550 | 4.063 |
| 600 | 4.141 |
| 650 | 4.293 |
| 700 | 4.355 |
| 750 | 4.449 |
| 800 | 4.513 |
| 850 | 4.544 |
| 900 | 4.599 |
| 950 | 4.642 |
| 1000 | 4.714 |
| 1050 | 4.724 |
| 1100 | 4.793 |
| 1150 | 4.852 |
| 1200 | 4.854 |

As is clear from Table 3, the samples "c", "d" and "e" have good electric conductivities and bending strengths and need only one firing step, and are, therefore, most preferable. The sample "b" has good properties but needs two times of firing. The sample "f" has a slightly low bending strength.

As a result, it was found out that the Si content in the Si—SiC sintered material is preferably 3–63% by weight, more preferably 10–30% by weight.

As is also clear from Table 4, the sample "d" has a thermal expansion coefficient of $3.0 \times 10^{-6}$ 1/°C. or less at 200° C. which is a temperature used in production of liquid crystal panels.

EXAMPLE 4

The same pressure plate sample (consisting of an Si—SiC sintered plate) as used in Example 1 was measured for various properties. The results are shown in Table 5.

COMPARATIVE EXAMPLE 7

The same pressure plate sample (consisting of alumina of 99% purity) as used in Comparative Example 3 was measured for various properties. The results are shown in Table 5.

TABLE 5

|  | Example 4 | Comparative Example 7 |
|---|---|---|
| Density (g/cm$^3$) | 3.0 | 3.8 |
| Bending strength (kgf/mm$^2$) | 26.5 | 28.5 |
| Young's modulus (GN/m$^2$) | 350 | 330 |
| Thermal expansion coefficient (1/° C.) | 4 × 10$^{-6}$ | 8 × 10$^{-6}$ |
| Thermal conductivity (W/m · k) | 150 | 16 |
| Specific heat (KJ/kg · K) | 1.7 | 2.1 |
| Electric conductivity (Ω · cm) | 10$^{-1}$ | 10$^{13}$ |

As is clear from Table 5, the pressure plate sample consisting of an Si—SiC sintered material, as compared with the pressure plate sample consisting of alumina of 99% purity, has an excellent Young's modulus and a thermal expansion coefficient of about half of that of the latter sample although the bending strength of the former sample is slightly inferior to that of the latter sample. Consequently, the former sample is deformed only slightly when a load is applied thereto, and produces a small strain when heated. Further, the former sample, as compared with the latter sample, shows a very large thermal conductivity and yet a somewhat small specific heat. Therefore, the former sample can heat a material to be heated, uniformly and in a short time. Furthermore, the former sample can allow static electricity to disappear easily because it has a large electric conductivity, and its small density allows for production of a lightweight pressure plate.

EXAMPLE 5

A liquid crystal panel was produced using a pair of pressure plates consisting of an Si—SiC sintered material. The schematic drawings of the production process used therefor are shown in FIG. 3 and FIG. 4.

Figure 3:
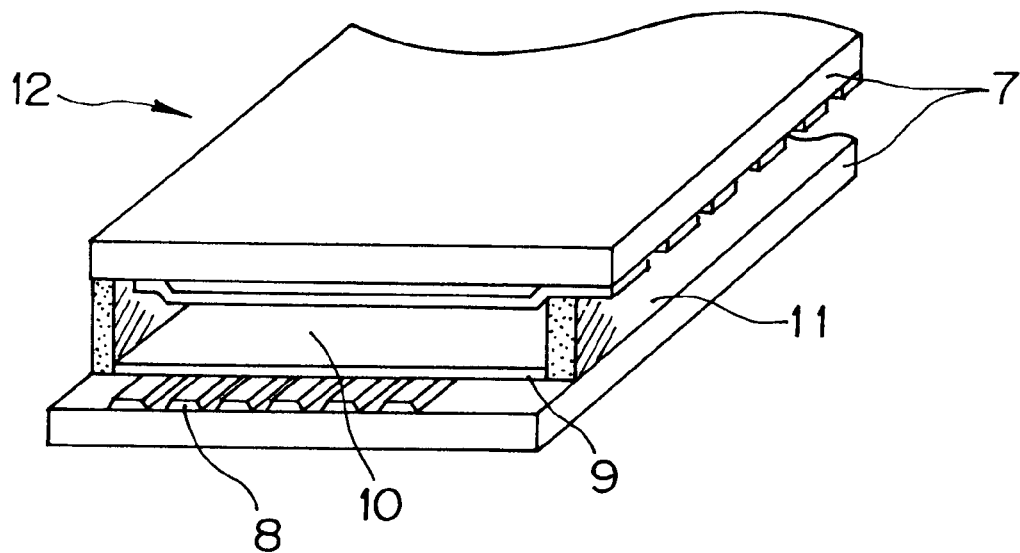
FIG. 3 is a drawing showing a step of the process used for production of the liquid crystal panel of Example 5.
Figure 4:
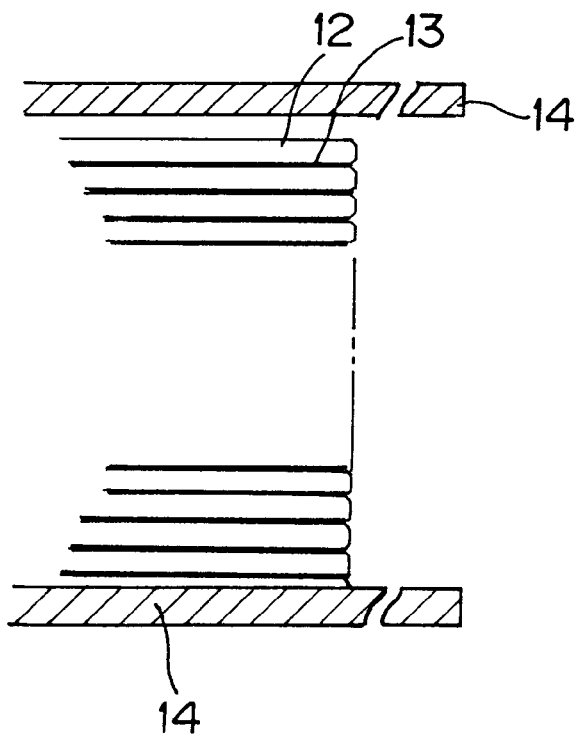
FIG. 4 is a drawing showing another step of the process used for production of the liquid crystal panel of Example 5.

First, as shown in FIG. 3, two glass substrates 7 each of 400 mm×350 mm×1.2 mm (thickness) were arranged in parallel and there were placed a transparent electro-conductive film 8 and an orientated film 9 on each of the sides of the glass substrates 7 facing each other. Then, a liquid crystal 10 was sealed in between the glass substrates 7, followed by lamination of the two glass substrates with an adhesive 11, to produce a laminated glass substrate 12. Next, as shown in FIG. 4, ten such laminated glass substrates 12 were laminated with a resin spacer 13 placed between each two adjacent substrates 12. The resulting material was sandwiched between two pressure plates 14 each composed of a Si—SiC sintered material composed of 20% by weight of Si and 80% by weight of SiC and each having a dimension of 400 mm×350 mm×5 mm (thickness), a surface roughness of 3–8 μm and a flatness of 20–25 μm. A pressure of 500 g/cm$^2$ was applied to the pressure plates 14 and, simultaneously therewith, heating was conducted at 200° C. These pressure and temperature conditions were maintained for 30 minutes. Then, the system was cooled slowly to produce liquid crystal panels.

Each liquid crystal panel had good gap accuracy between the two glass substrates, a small surface roughness (of each glass substrate) and high dimensional accuracy. Further, there was no dust adsorption and the yield of product was high. Incidentally, the used pressure plates consisting of an Si—SiC sintered material have no particular restriction as to the thickness, but a thickness of 1–40 mm, for example, is preferable.

EXAMPLE 6

Figure 5:
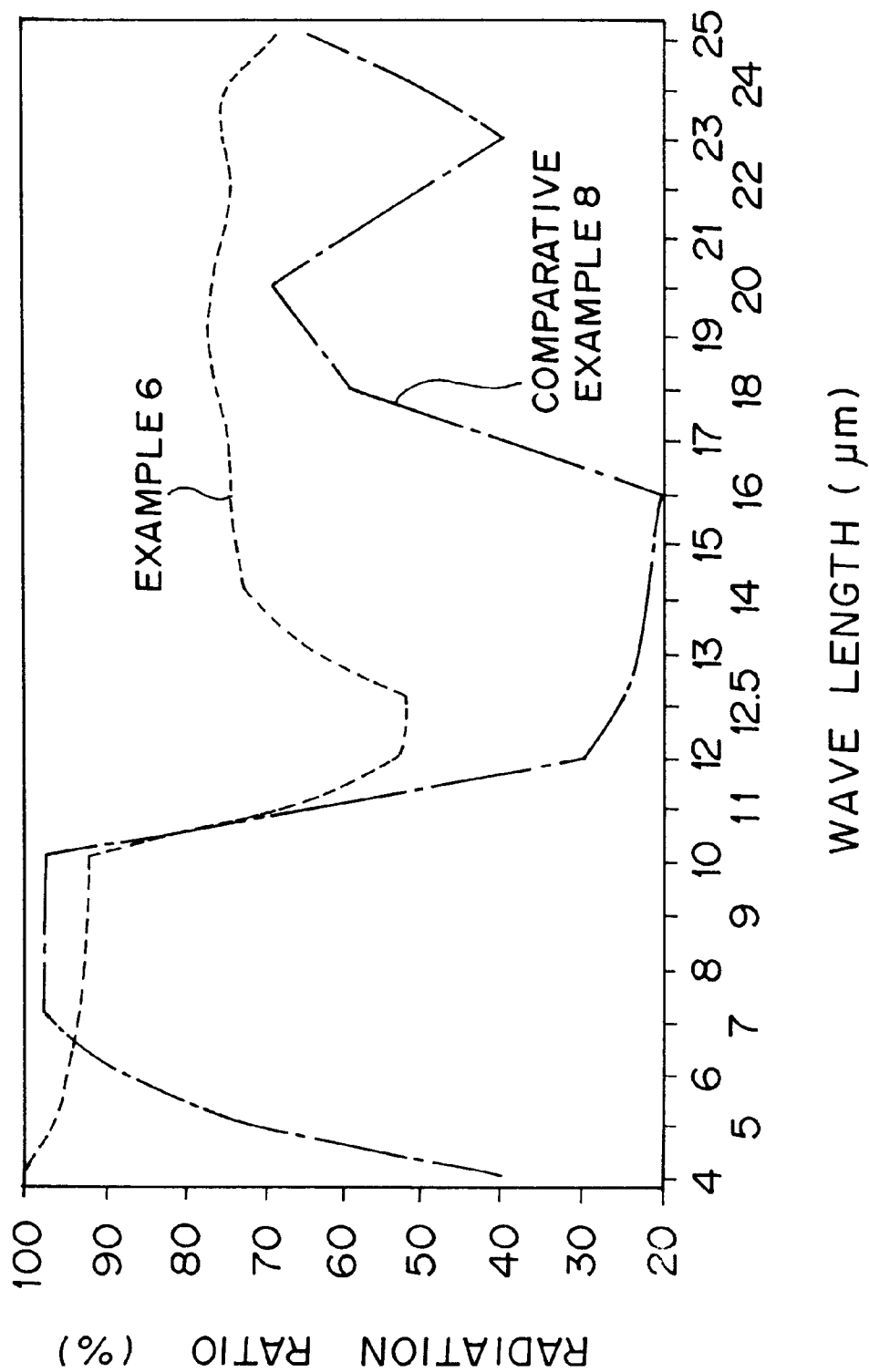
FIG. 5 is a graph showing the radiation ratios of (1) an example of the pressure plate of the present invention and (2) a conventional pressure plate.

A heater was connected to the same pressure plate sample (consisting of an Si—SiC sintered material) as used in Example 1, and then the sample was heated to 200° C. and measured for radiation ratio of a far-infrared beam. The result is shown in FIG. 5. Incidentally, the radiation ratio in FIG. 5 is expressed as a ratio when the radiation of a black material is taken as 100.

COMPARATIVE EXAMPLE 8

The same pressure plate sample (consisting of alumina of 99% purity) as used in Comparative Example 3 was measured for radiation ratio of a far-infrared beam in the same manner as in Example 6. The result is shown in FIG. 5.

As is clear from FIG. 5, the pressure plate sample consisting of an Si—SiC sintered material shows excellent radiation of far-infrared beam over a wide wavelength region. Thus, the pressure plate sample can heat a material to be heated, stably independently of the kind of resin covering said sample.

As stated above, the pressure plate of the present invention, which is made of an Si—SiC sintered material containing SiC and Si, produces substantially no strain when heated. A pair of the pressure plates can produce a liquid crystal panel which has good gap accuracy between two glass substrates, which has a small surface roughness and which has high dimensional accuracy.

Further, since the Si—SiC sintered material has a high electric conductivity, there occurs no dust adsorption during the pressurization step and there is no deterioration in product (i.e. liquid crystal panel) quality, and an increase in product yield can be obtained.

Furthermore, the process of the present invention can produce a liquid crystal panel economically and in a smaller number of steps.

What is claimed is:

1. A process for producing a liquid crystal panel, which comprises:

a first step of sealing a liquid crystal between a plurality of substrates; and a second step of subjecting the resulting material obtained in said first step to pressurization and heating by the use of a pair of pressure plates to bond said plurality of substrates, said pressure plates being composed of a Si—SiC sintered material consisting essentially of SiC and Si.

2. A process according to claim 1, wherein the Si content in said Si—SiC sintered material is 3–63% by weight.

3. A process according to claim 1, wherein said pressure plates have a thermal expansion coefficient of 3×10$^{-6}$ 1/°C. or less and a thermal conductivity of 130 w/m.K or more.

4. A process according to claim 1, wherein said pressure plates are partially or wholly covered with at least one resin selected from the group consisting of silicone rubber, polytetrafluoroethylene, and urethane resin.

5. A process according to claim 1, wherein the pressurization and heating are conducted simultaneously.

* * * * *